(12) United States Patent
Harris

(10) Patent No.: US 9,054,838 B1
(45) Date of Patent: Jun. 9, 2015

(54) SYNCHRONIZATION RECOVERY SYSTEM

(71) Applicant: Fredric J. Harris, Spring Valley, CA (US)

(72) Inventor: Fredric J. Harris, Spring Valley, CA (US)

( * ) Notice: Subject to any disclaimer, the term of this patent is extended or adjusted under 35 U.S.C. 154(b) by 0 days.

(21) Appl. No.: 13/886,258

(22) Filed: May 2, 2013

Related U.S. Application Data

(60) Provisional application No. 61/641,872, filed on May 2, 2012, provisional application No. 61/641,876, filed on May 2, 2012, provisional application No. 61/705,268, filed on Sep. 25, 2012.

(51) Int. Cl.
  *H03D 1/00* (2006.01)
  *H04L 7/00* (2006.01)
  *H04L 7/033* (2006.01)
(52) U.S. Cl.
  CPC ............ *H04L 7/0037* (2013.01); *H04L 7/0087* (2013.01); *H04L 7/0331* (2013.01); *H04L 7/0008* (2013.01)
(58) Field of Classification Search
  USPC .......................................... 375/343, 354, 355
  See application file for complete search history.

(56) References Cited

U.S. PATENT DOCUMENTS

| | | | | |
|---|---|---|---|---|
| 5,930,231 A | * | 7/1999 | Miller et al. | 370/210 |
| 6,898,235 B1 | * | 5/2005 | Carlin et al. | 375/219 |
| 7,349,464 B2 | * | 3/2008 | Kimura | 375/152 |
| 7,430,254 B1 | * | 9/2008 | Anderson | 375/342 |
| 2003/0039363 A1 | * | 2/2003 | Wildhagen | 381/13 |
| 2004/0042557 A1 | * | 3/2004 | Kabel et al. | 375/260 |
| 2005/0123060 A1 | * | 6/2005 | Maltsev et al. | 375/260 |

* cited by examiner

*Primary Examiner* — Shuwang Liu
*Assistant Examiner* — Nader Bolourchi
(74) *Attorney, Agent, or Firm* — Law Office of Glenn R. Smith; Glenn R. Smith; Lisa L. Smith

(57) ABSTRACT

A synchronization recovery system is a digitized signal input derived from an analog front-end of a digital receiver and having a relatively wide bandwidth. An analysis channelizer decomposes the digitized signal input into time domain analysis channels each having a relatively narrow bandwidth. A synthesis channelizer recomposes the analysis channels so as to generate a digitized output signal. A multiplier array is disposed between the analysis channelizer and the synthesis channelizer so as to define a timing recovery vector responsive to a phase shift for retarding and advancing a timing clock. A phase locked loop is responsive to the synthesis channelizer digitized output signal so as to modify the timing recovery vector, which applies the phase shift to the time series output for each of the synthesis channelizer channels.

3 Claims, 12 Drawing Sheets

SYNCHRONIZATION RECOVERY SYSTEM

CROSS-REFERENCE TO RELATED APPLICATIONS

The present application claims priority benefit under 35 U.S.C. §119(e) to U.S. Provisional Patent Application Ser. No. 61/641,872, filed May 2, 2012, titled Frequency Domain Equalization System; U.S. Provisional Patent Application Ser. No. 61/641,876, filed May 2, 2012, titled Symbol Timing Recover System; and U.S. Provisional Patent Application Ser. No. 61/705,268, filed Sep. 25, 2012, titled Analysis and Synthesis Filter Banks; all of the above-referenced provisional applications are hereby incorporated in their entireties by reference herein.

The present application has disclosure in common with the following co-pending applications: U.S. patent application Ser. No. 13/886,244, filed May 2, 2013, titled Channelizer Domain Digital Receiver; and U.S. patent application Ser. No. 13/886,267, filed May 2, 2013, titled Equalization System; all of the above-referenced co-pending utility applications are hereby incorporated in their entireties by reference herein.

SUMMARY OF THE INVENTION

One aspect of a synchronization recovery system is a digitized signal input derived from an analog front-end of a digital receiver and having a relatively wide bandwidth. An analysis channelizer decomposes the digitized signal input into time domain analysis channels each having a relatively narrow bandwidth. A synthesis channelizer recomposes the analysis channels so as to generate a digitized output signal. A first multiplier array is disposed between the analysis channelizer and the synthesis channelizer so as to define a timing recovery vector. A second multiplier array is disposed between the analysis channelizer and the synthesis channelizer so as to define a matched filtering vector. In various embodiments, the timing recovery vector comprises a set of complex rotators that define a phase shift for retarding and advancing a timing clock. A phase locked loop is responsive to the synthesis channelizer digitized output signal so as to modify the timing recovery vector. The phase shift is applied directly to a time series output for each of the synthesis channelizer channels.

DETAILED DESCRIPTION OF THE PREFERRED EMBODIMENTS

Figure 1:
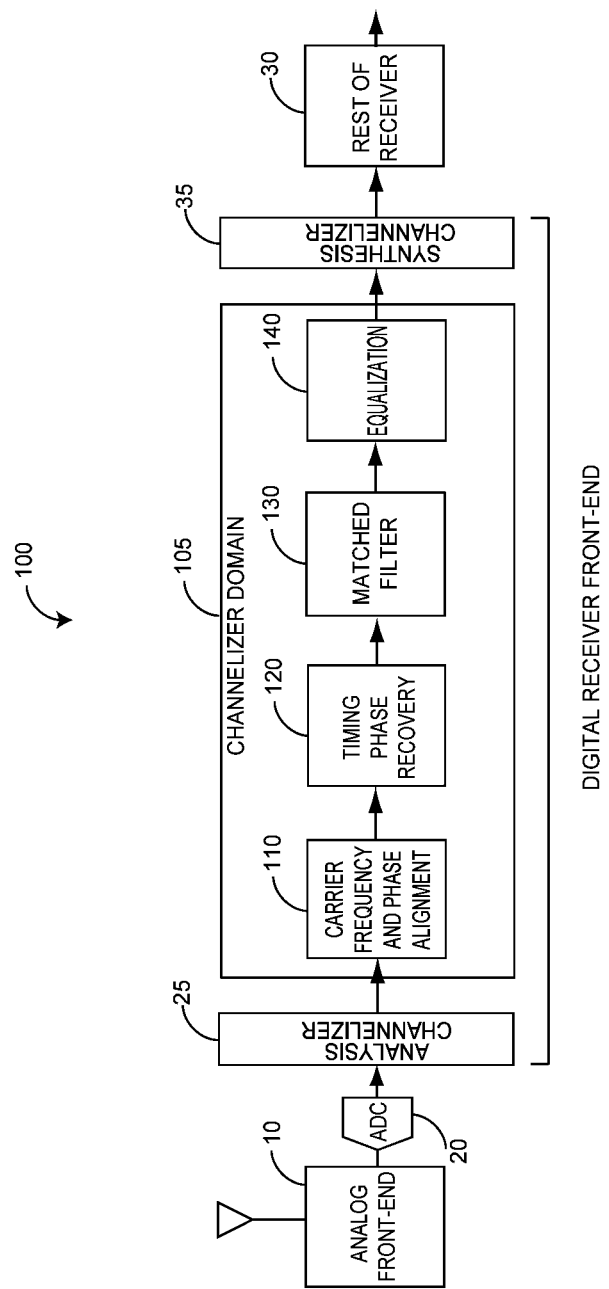
FIG. 1 is a general block diagram of a digital receiver front-end advantageously implemented as channelizer domain processes.

FIG. 1 generally illustrates a digital receiver front-end 100 that inputs an analog front-end 10 signal digitized by an ADC 20 and outputs a digital front-end signal for further receiver processing 30. The digital front-end 100 has digital receiver processes 110-140 executing within a channelizer domain 105. As described in detail with respect to FIGS. 6-12, below, the channelizer domain 105 advantageously executes these processes as a cascade of multiplier arrays. In an embodiment, channelizer domain processes include carrier frequency and phase alignment 110, timing phase recovery 120, matched filtering 130 and equalization 140.

Figure 2:
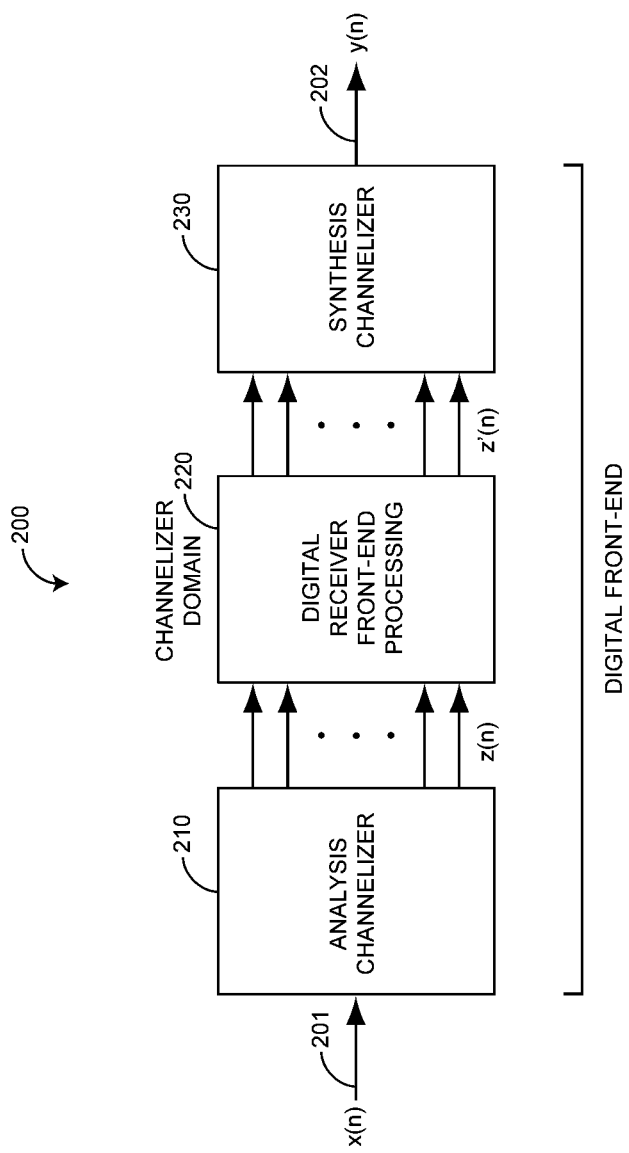
FIG. 2 is a general block diagram of a digital receiver front-end processed between a analysis channelizer and an synthesis channelizer.

FIG. 2 further illustrates an advantageous channelizer-domain digital receiver front-end 200 having a digitized receiver input x(n) 201 from an analog front-end ADC and that generates an output y(n) 202 for further receiver processing. The channelizer domain 220 advantageously allows multiplier array cascade processing so as to implement a variety of synchronization functions, including timing recovery and carrier frequency and phase recovery, as well as filtering functions, such as equalization and match filtering, as described in further detail with respect to FIGS. 6-12, below. The digital front-end 200 has a cascade of an input analysis channelizer 210 and an output synthesis channelizer 230 that advantageously defines a channelizer domain 220 for digital receiver processing in the time domain.

As shown in FIG. 2, an analysis channelizer 210 inputs a wide bandwidth time signal x(n) and converts it into smaller bandwidth time signals (channels). These channels z(n) are processed with a cascade of multiplier arrays in the channelizer (time) domain. a synthesis channelizer 230 reconverts the modified small bandwidth channels into an wide bandwidth output time signal y(n). In particular, all of the channelizer domain processing is advantageously accomplished in the time domain.

Perfect Reconstruction Filter Banks

Figure 3:
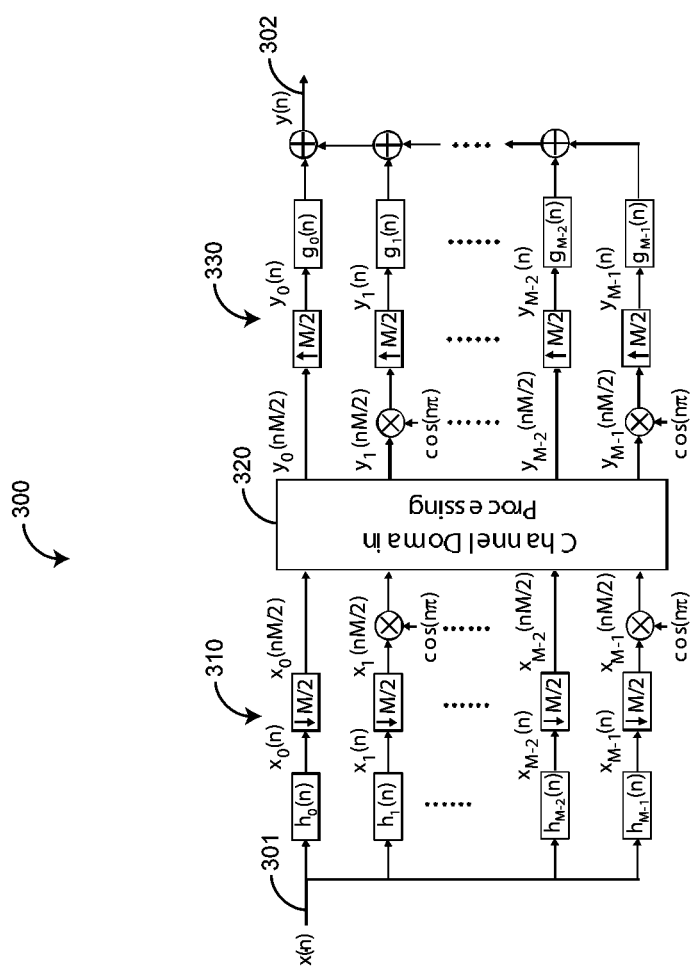
FIG. 3 is detailed block diagram of a perfect reconstruction (PR) filter bank embodiment having filters centered at multiple frequencies.

FIG. 3 illustrates an advantageous perfect reconstruction (PR) channelizer domain processor 300 having an input M-path analysis filter bank 310 and an output M-path synthesis filter bank 330. The M-path analysis filter bank decomposes the input time series x(n) into M equally spaced, equal bandwidth sub-channels while performing M/2:1 down-sampling. The synthesis filter bank reassembles the M sub-channels while performing 1:M/2 up-sampling to generate the output time series y(n). Let h(n) be the analysis filter bank 310 prototype low-pass filter of length $N_1$; and g(n) be the synthesizer filter bank 330 prototype low-pass filter of length $N_2$ where, in an embodiment, $N_1$ and $N_2$ are odd numbers.

Then, the analysis filter $h_l(n)$ for the $l^{th}$ path can be written as:

$$h_l(n) = h(n)e^{j\omega_l n}, \text{ where } \omega_l = \frac{2\pi}{M}l \text{ for } l = 0, 1, \ldots, M-1 \quad (1)$$

Similarly, the $l^{th}$ path synthesis filter $g_l(n)$ can be written as:

$$g_l(n) = g(n)e^{j\omega_l n} \quad (2)$$

The signal at the output of the $l^{th}$ analysis filter, denoted as $r_l(n)$, can be written as:

$$r_l(n) = \sum_{m=0}^{N_1-1} h_l(m)r(n-m) \quad (3)$$

Signal $r_l(n)$ is then M/2:1 down-sampled and translated by aliasing to baseband. Let $\hat{r}_l(n)$ be the $l^{th}$ down sampled baseband signal which is written as:

$$\hat{r}_l(n) = r_l\left(\frac{M}{2}n\right)e^{-j\omega_l\frac{M}{2}n} = r_l\left(\frac{M}{2}n\right)e^{-j\pi ln} = \begin{cases} r_l\left(\frac{M}{2}n\right), l \text{ is even} \\ r_l\left(\frac{M}{2}n\right)\cos(n\pi), l \text{ is odd} \end{cases} \quad (4)$$

As shown in FIG. 3, after the M/2:1 down sampling, all the even indexed channels alias to the baseband and all the odd indexed channels alias to the half sample rate. Note that, the odd indexed channels can be translated to the baseband trivially by multiplying with $\cos(n\pi)$ after the down sampling process. Ignoring for now intermediate digital receiver processing, such as equalization and matched filtering processing steps described below, $\hat{r}_l(n)$ is initially 1:M/2 zero packed and then fed into the $l^{th}$ path synthesis filter. The 1:M/2 zero packing creates M/2 spectral copies and the synthesis filter $g_l(n)$ selects the one centered on $\omega_l$ and rejects all other copies. The M/2 sampling rate reduction allows the intermediate signal processing blocks to operate at reduced sample rate which makes the structure computationally efficient.

Further shown in FIG. 3, the overall PR channelizer output (analysis-synthesis chain) signal y(n) can be expressed as:

$$y(n) = \sum_{l=1}^{M-1} r(n) * h_l(n) * g_l(n) \quad (5)$$

$$= \sum_{l=1}^{M-1} \left\{ \left[ \sum_{m=0}^{N_S-1} h(m)e^{j\omega_l m}g(n-m)e^{j\omega_l(n-m)} \right] \times r(n) \right\}$$

$$= \sum_{l=1}^{M-1} [(h(n) * g(n))e^{j\omega_l n}] * r(n)$$

$$= \sum_{l=1}^{M-1} h_{NYQ}(n)e^{j\omega_l m} * r(n)$$

where $h_{NYQ}(n) = h(n)*g(n)$, is the Nyquist pulse.

Also shown in FIG. 3, the PR channelizer, according to EQ. 5, implements a bank of M equally spaced Nyquist filters each centered on $\omega_l$. The frequency response of the adjacent Nyquist filters overlap at −6 dB (in power), and exhibit an even symmetry property with respect to the crossover point. Thus, the perfect reconstruction property expressed by in EQ. 6 is achieved $$y(n) = \sum_{l=1}^{M-1} h_{NYQ}(n)e^{j\omega_l n} * r(n) = r(n) * \delta\left(n - \frac{N_1 + N_2}{2}\right) \quad (6)$$

Figure 4:
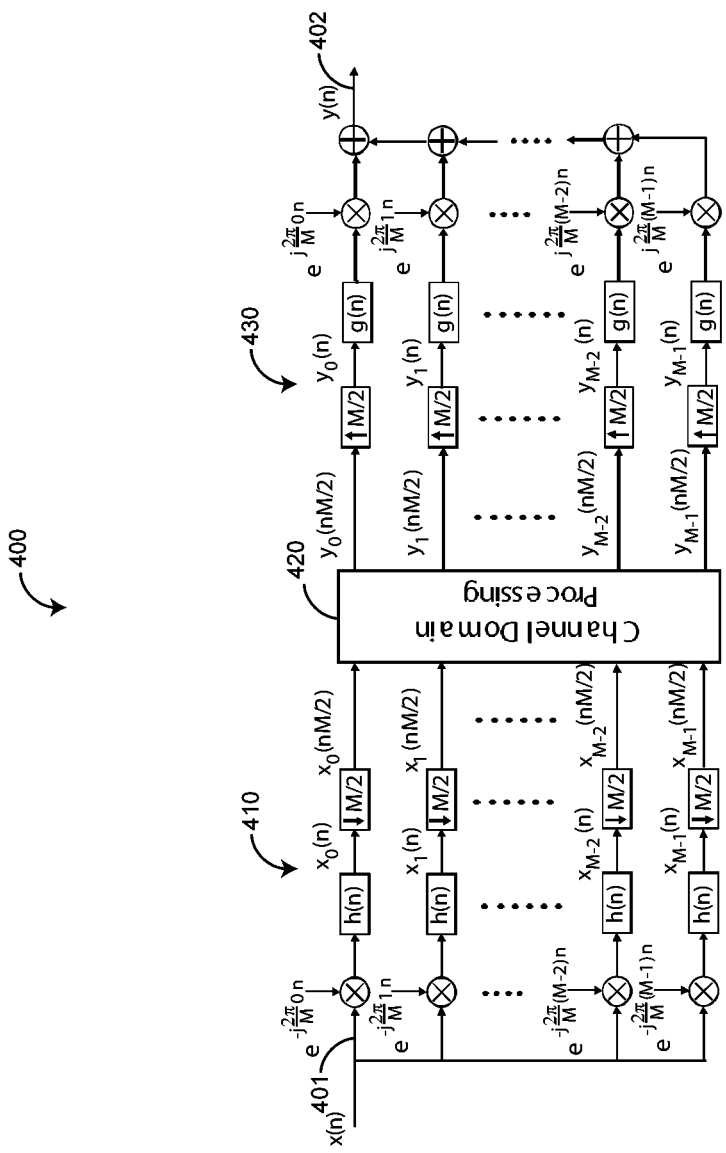
FIG. 4 is detailed block diagram of a perfect reconstruction (PR) filter bank embodiment having filters centered at baseband.

FIG. 4 illustrates an equivalent perfect reconstruction (PR) channelizer domain processor 400 having an input M-path analysis filter bank 410 and an output M-path synthesis filter bank 430. The M-path analysis filter bank decomposes the input time series x(n) into M equally spaced, equal bandwidth sub-channels while performing M/2:1 down-sampling. The synthesis filter bank reassembles the M sub-channels while performing 1: M/2 up-sampling to generate the output time series y(n). Let h(n) be the analysis filter bank 410 prototype low-pass filter of length $N_1$; and g(n) be the synthesizer filter bank 430 prototype low-pass filter of length $N_2$ where, in an embodiment, $N_1$ and $N_2$ are odd numbers. In this embodiment of the perfect reconstruction filter bank, rather than up convert the analysis filters to their desired center frequencies, the input signal components from each same center frequency is down converted to baseband and filtered with the prototype low pass filter and then down sampled M-to-1. Similarly rather than up-sample the inputs to the output filter bank and then filter the signal component centered at the desired Nyquist zone with the up-converted prototype synthesis filter, inputs to output filter bank are up-sampled 1-to-M/2, baseband filtered by the prototype synthesis filter, and then up converted to the same desired output center frequency with their final up-converters and added to form the composite output signal. This embodiment requires significantly more computational resources than the embodiment described with respect to FIG. 3, above. In particular, the processing chain of FIG. 3 does not rely upon aliasing to perform the spectral down conversion in the analysis filter bank nor rely upon aliasing to perform the spectral up conversion in the synthesis filter bank.

Polyphase Filters

Figure 5:
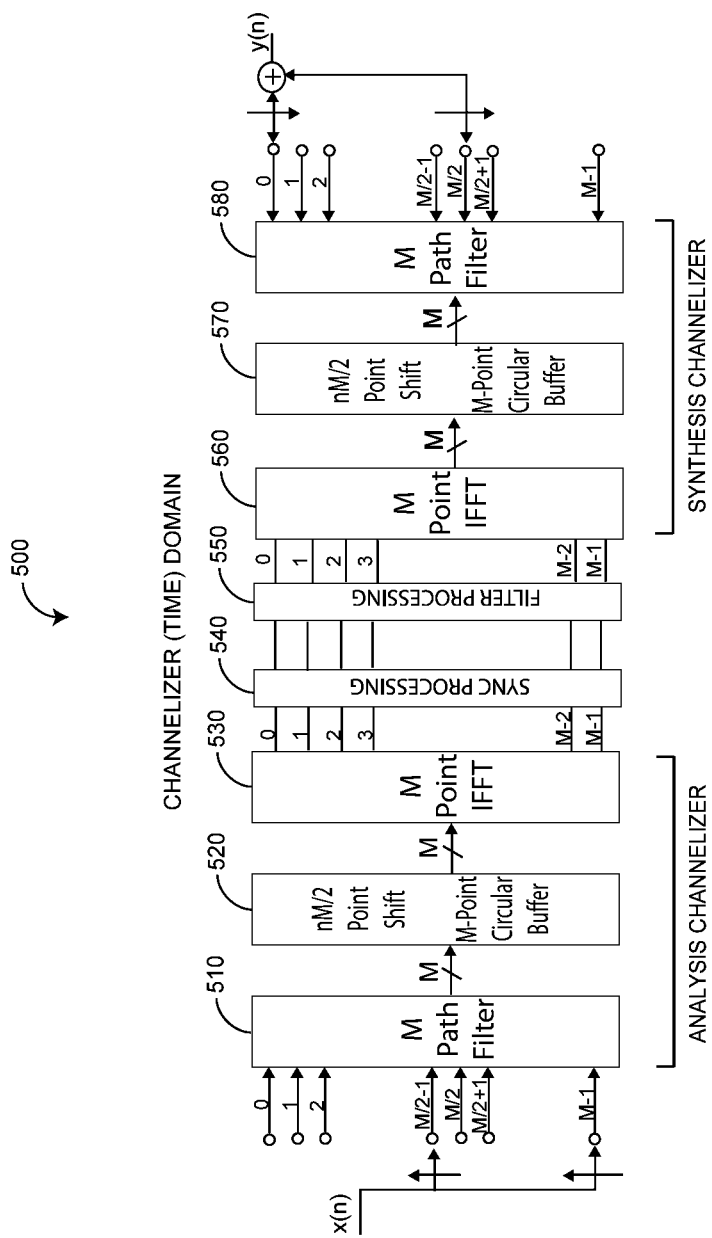
FIG. 5 is a detailed block diagram of a polyphase PR filter embodiment for advantageous channelizer-domain sync processing and filter processing.

FIG. 5 illustrates a polyphase PR filter embodiment 500 for advantageous channelizer-domain synchronization (sync) processing and filter processing. In this structure, the M-path polyphase filter arms are variants of a polyphase partition. The filter in the r-th row in the upper half of the filter partition are the polynomials $H_r(Z^2)$ and those in the corresponding lower half of the filter are the polynomials $Z^{-1}H_{(r+M/2)}(Z^2)$. The polynomials $H_r(Z^2)$ and the delayed $Z^{-1}H_{(r+M/2)}(Z^2)$ in the upper and lower halves permit the current M/2 sample values in the top half of the filter to interact with the previous M/2 sample values in the lower half of the filter while the output commutator accepts and sums M/2 outputs from the upper and lower halves of the same partitioned filter. The time offset between the upper and lower half of the filter is responsible for a frequency dependent phase shift between successive length M/2 time shifts. This phase offset is removed by the successive shifts of the M/2 circular buffer between the polyphase filter and the IFFT.

As shown in FIG. 5, having the input commutator deliver M/2 inputs to both the upper and lower half of the polyphase partition is not an efficient way to allocate input sample data memory. In fact memory for the input samples and memory for the polyphase filter weights are partitioned differently for efficiency. A more efficient memory access scheme is used to permit the current M/2 input samples to operate in the upper half of the filter while the previous M/2 input samples operate in the lower half of the filter partition. If Np is the number of coefficients in each polyphase filter path, the coefficient memory is partitioned into an M-by-Np array and the input (and output) data memory is partitioned into an M/2-by-2Np array rather than an M-by-2Np array suggested by the polyphase polynomials $H_r(Z^2)$ and $Z^{-1}H_{(r+M/2)}(Z^2)$. The phase shift can also be applied as a circular shift of buffers between the filters and the IFFT based phase rotators in a polyphase filter version of the filter bank.

Channelizer Domain Processing—Generally

Also shown in FIG. 5, advantageous channelizer domain "sync processing" and "filter processing" blocks are added between the analysis and synthesis channelizers. In an embodiment, described in further detail with respect to FIGS. 6-9, below, this intermediate processing block is composed of complex scalar multiplier arrays. Each multiplier array modifies the gain and phase of each analysis channelizer output, which is equivalent to modifying the spectrum of the input signal in the piecewise linear sense, thus performing frequency filtering in the time domain. Because the system is linear time invariant, the filtering operations in the sense of the multiplier arrays can be cascaded in any order. See, e.g. FIG. 6, below. In a particular case described with respect to FIG. 7, below, the receiver needs a matched filter and an equalizer filter, thus two multiplier arrays are needed to accomplish the task.

Detailed Channelizer Domain Processing

Figure 6:
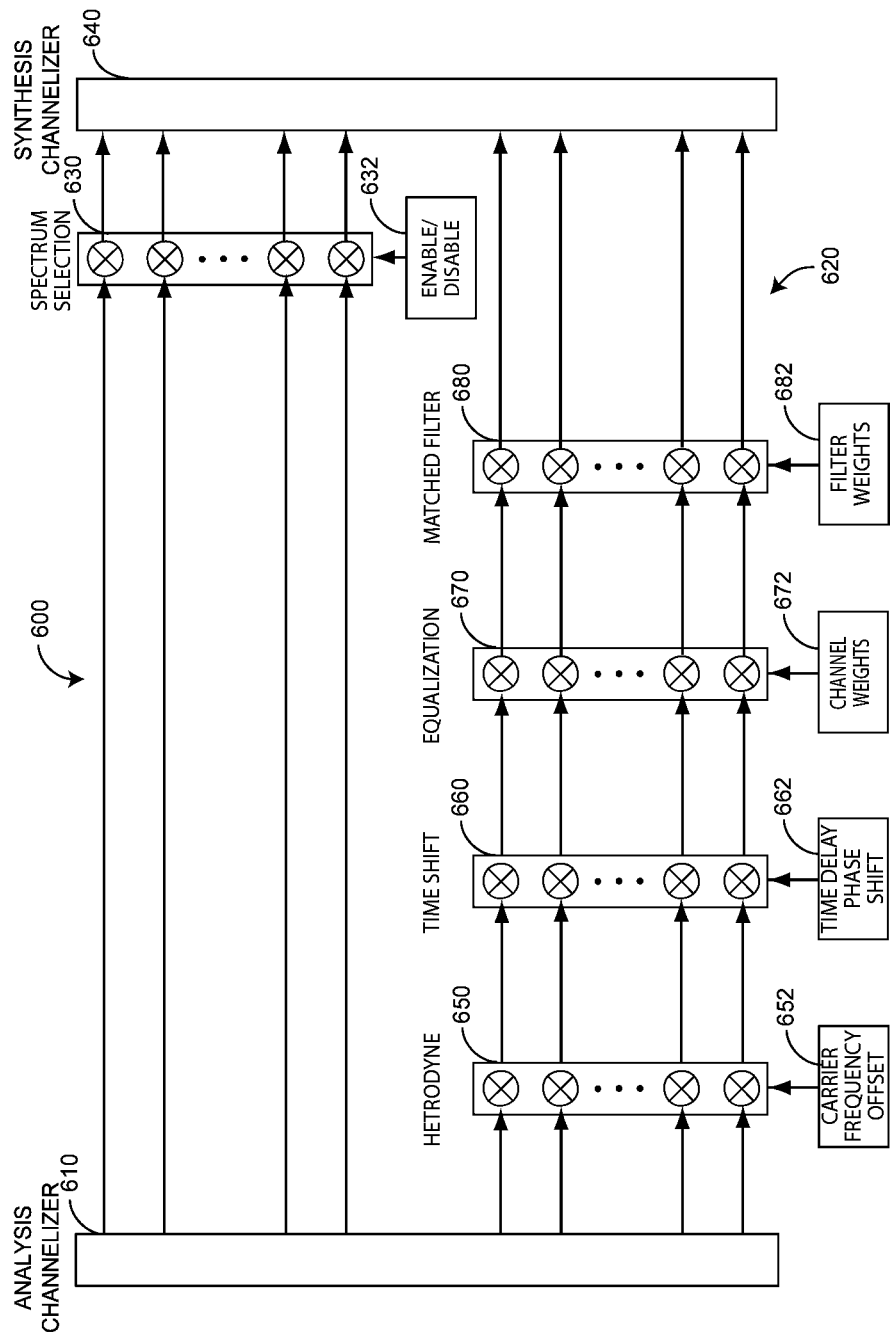
FIG. 6 is a detailed block diagram of channelizer domain sync processing and filter processing.

FIG. 6 illustrates a broad range of digital receiver processing that is performed in the channelizer domain. A primary advantage of a channelizer based filtering process over a standard direct convolution based filtering process is processing speed. An input signal may have an extremely wide bandwidth requiring a very high sample rate to satisfy the Nyquist Sampling Criterion. As an example, if the input signal has a 1.2 GHz two sided bandwidth, the sample rate may be selected to be 2.4 GHz. It would be extremely difficult to perform even simple signal processing tasks such as matched filtering or channel equalization filtering at this high sample rate. This is because the 2.4 GHz sample rate is on the order of the fastest internal clock rates of modern signal processing engines and the arithmetic processors are unlikely to able to perform the required number of multiplies and adds necessary to perform the filtering task. The input filter bank partitions the input signal into multiple reduced bandwidth signals that are each sampled at appropriately reduced sample rates. As an example, the input signal sampled at 2.4 GHz can be processed in a 120 channel filter bank to form 120 output data streams each sampled at 40 MHz. Here the sample rate associated with each of the multiple channel data streams is selected to be twice the channel bandwidth as was the sample rate of the input signal selected to be twice the signal bandwidth. The arithmetic processors can easily apply at the 40 MHz sample rate, a frequency dependent gain term containing amplitude and phase polar components or in-phase and quadrature-phase (I-Q) Cartesian components. The multiple low sample rate, reduced bandwidth, and now scaled time series are presented to the output channel filter bank to form the full bandwidth output signal with the original high input sample rate. The spectrum of the reconstituted output time series differs from the spectrum of the original input time series by the frequency dependent gains applied to the separate channel time signals. This technique advantageously enables multiple narrow bandwidth, reduced sample rate processors to operate on extremely wide bandwidth, very high sample rate input signals. Note that the multiple, frequency dependent gains are applied to output the time series from each channel of the channel filter bank and are not applied to the spectrum of the input time signal as they would be in the fast convolution process involving an input FFT and an output IFFT.

Figure 7:
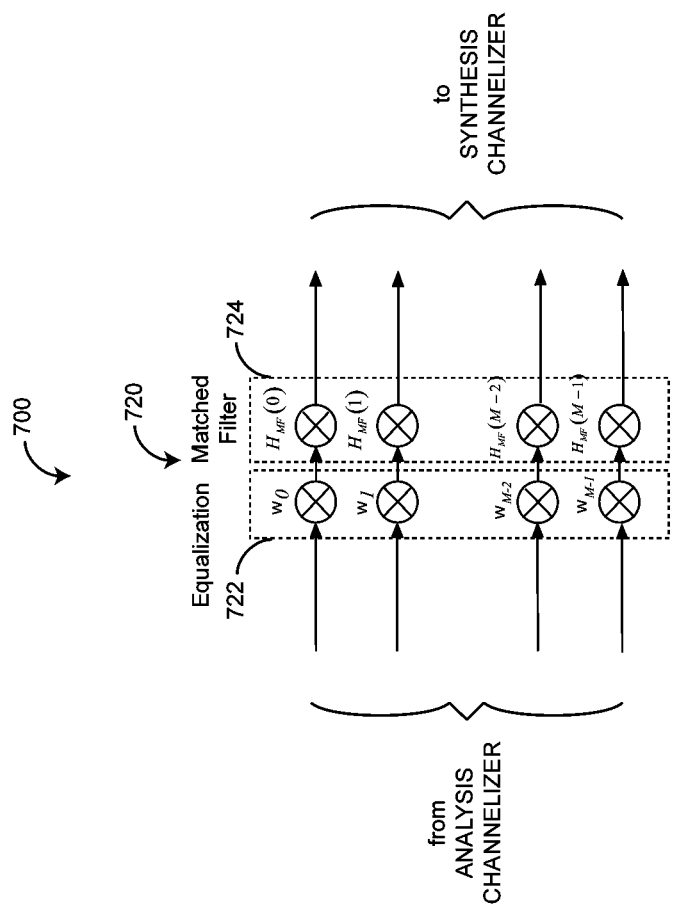
FIG. 7 is a general block diagram of equalization and matched filter processing in the channelizer domain.

Another advantage of a channelizer based filtering process is that multiple equivalent filtering operations can be embedded in the same channelizer based system. For instance, a receiver may perform two filtering operations such as channel equalization and matched filter filtering. Each process is performed in separate convolution based filtering engines. Further, when the input signal is complex with quadrature components, I and Q, two versions of each filter are required to operate on the two quadrature components of the input time series. In an advantageous embodiment, once the input signal is partitioned into multiple narrow bandwidth, reduced sample rate time series, the frequency dependent weights corresponding to the matched filter are applied and then the frequency dependent weights corresponding to the channel equalize filter are applied, as shown in FIG. 7, below. In another embodiment, the two sets of frequency dependent weights can be combined off line by their point by point products to form a single frequency dependent gain to be applied once to the channelized time series between the input and output channel filter banks. If the frequency dependent weights are slowly time varying, as they might be as a channel equalizer filter tracks a slowly time varying channel, it may be preferred to keep the two sets of channelizer weights distinct and applied sequentially.

Channelizer-based filtering is also advantageously applied to the heterodynes required for frequency and phase recovery and the interpolation filtering required to time align the sample times with the epochs of the underlying modulation waveform. These tasks would also be extremely difficult to perform at the sample rates described with respect to equalization, above. The arithmetic processors can then easily apply, at the 40 MHz sample rate, a frequency dependent phase shift term by in-phase and quadrature-phase (I-Q) Cartesian components to implement the channelizer based time alignment traditionally implemented by a time domain interpolator. This first processing task can then be followed by a second processing task which applies channelized gain weights to implement a matched filter. These channelizer based time alignment and matched filter operations are further illustrated with respect to FIG. 9, below. The multiple low sample rate, reduced bandwidth, and now heterodyned and scaled time series are presented to the output channel filter bank to form the full bandwidth output signal with the original high input sample rate. The spectrum of the reconstituted output time series differs from the spectrum of the original input time series by the frequency dependent gains applied to the separate channel time signals.

The filter bank processing mechanism can also be applied to the task of carrier frequency and phase alignment. The heterodyne and the phase offset correction can be applied in the channelizer domain by shifting the frequency and phase of each time series from the input filter bank. The task is then performed by multiple low speed complex heterodynes rather than a single very high speed heterodyne. Note that the ability to perform this task on individual channel time series in the channelizer is a capability unique to the channelizer structure. The structure can easily be mistaken to be an implementation of a fast convolver process in which the input FFT forms the spectrum of the input signal which is modified by the spectral weights of a filter and then converted back to the time domain by the output IFFT. It is well understood that the frequency offset operation described in the channelizer domain cannot similarly be performed in the frequency domain in the fast convolution process. Note that the multiple frequency-offset operators and the frequency dependent gains are applied to output the time series from each channel of the channel filter bank and are not applied to the spectrum of the input time signal, as they would be in the fast convolution process involving an input FFT and an output IFFT.

A further advantage of a channelizer-based sync process is that multiple equivalent filtering and/or sync operations can be embedded in the same channelizer-based system. For instance, a receiver may perform a sync operation such as timing recovery or time alignment by an interpolator filter and also matched filter filtering. Traditionally, each process is performed in separate convolution based filtering engines. Further, when the input signal is complex with quadrature components, I and Q, two versions of each filter are required to operate on the two quadrature components of the input time series. In the system described above, once the input signal is partitioned into multiple narrow bandwidth, reduced sample rate time series, then frequency dependent phase shift weights are applied, corresponding to an interpolator. Then frequency dependent weights are applied corresponding to a matched filter. The folding of the carrier frequency and phase alignment into channelizer domain processing is a separate operation, different from filtering, that enables multiple narrow-bandwidth time series formed by the input filter bank to be processed by multiple reduced speed processors.

As shown in FIG. 6, the processing blocks applied to the channeler time series between the analysis channelizer and the synthesis channelizer may contain more than one processing block and may perform more than one processing task. In the lower arms 620, a first subset of the available output channels of the analysis channelizer 610 are processed by the channelizer domain radio receiver processing vectors. In the upper arms 630, a second subset of the available output channels of the analysis channelizer 610 are processed by a different channelizer processing vector. This second vector, in this example, is a binary weighting sequence which selects a separate set of output channels from the analysis channelizer 610 to be assembled by the synthesis channelizer 640 as a wideband time domain signal for subsequent processing following the synthesis channelizer 640.

An example signal set that would benefit from this capability is the composite signal transmitted by many FM radio stations which contains a conventional wide modulation index FM stereo signal in a nominal 200 kHz bandwidth with a pair of accompanying High Definition OFDM signals in the two 100 kHZ adjacent bandwidth signals. The channels adjacent to an occupied FM band were traditionally forbidden bands, intentionally unoccupied to prevent cross modulation terms generated by input amplifier non-linearities from corrupting the FM modulated signal. The formerly empty adjacent band frequency bands are now harvested and occupied by a modulation scheme known as In-Band On-Carrier (IBOC) and marketed as high definition radio.

Equalization

FIG. 7 illustrates advantageous equalization and matched filter processing in the channelizer domain. SQRT-Nyquist filters can be used as low-pass prototype filters in both the analysis and synthesis channelizers so as to form a composite Nyquist pulse response that achieves perfect reconstruction (PR). A more flexible option uses a Nyquist filter in the analysis channelizer and a wider bandwidth low pass filter in the synthesis channelizer. The PR property of the Nyquist filters plays a fundamental role in the synthesis of the filter and in particular the equalization process. A selector, placed between the analysis and synthesis blocks, commutes the output ports of the first tier analysis channelizer that contains spectral fragments of the same signal bandwidths and properly delivers them to the up converter synthesis channelizers that reassemble them in baseband. Because the focus herein is the equalization process, for simplicity, in the following, a single signal bandwidth is considered as input to the system. This selection does not impact design issues and/or performance results.

When the received spectrum has been shifted to baseband and its sample rate has been properly reduced, channel equalization is performed before recovering the transmitted symbols. A challenging task is to embed the equalization process in channelizer-based software defined radios so as to minimize the total workload and maximize performance. Fighting artifacts caused by a multipath channel is a primary goal of mobile wireless transmitters and receivers, and performance and efficiency are the main aspects to consider in the design process. Described herein is an efficient frequency domain equalizer that can be embedded in a PR channelizer-based software defined radio.

It is well known that the effect of a multipath channel can be modeled as a distorting filtering process which affects both gain and phase profiles of the transmitted signal spectrum. Orthogonal frequency division multiplexing (OFDM) modulation is the best example of successful frequency domain equalization. Because the FFT bins of an OFDM system are orthogonal, and by virtue of the cyclic prefix, these signal components have been circularly convolved with the channel, and channel equalization can be performed as independent scalar gain and phase adjustments to the spectral component. As described herein, a related idea valid for arbitrary signals, not necessarily prepared signals such as OFDM, is channelizer-based receivers applied even when decomposed channels are not orthogonal or when the signal components are not circularly convolved with the channel.

At the output port of the first tier down converter channelizer, prior to synthesis, a set of complex scalars with appropriate gains and phase shifts are applied to each channelizer channel in order to compensate for the distorting effect of the multipath channel and to form a composite channel-equalizer frequency response which has uniform gain and phase. Knowledge of the channel is obtained by a channel probe. A channel control block adjusts the set of gain and phase rotators according to the knowledge of the wireless channel. Other forms of the equalization process can be implemented by adaptively updating estimates of the channel response Not considered is the noise coloring effect of the equalizer on the additive white Gaussian noise which enters the system along with the signal. When the white noise spectrum is multiplied with the set of coefficients it becomes colored and further filtering tasks can be performed in the system in order to re-whiten it.

The performance of channelizers with two spectral channel shapes, hence with two impulse response shapes, are described and analyzed herein. Both options produce a perfect reconstruction Nyquist pulse. Designs based on the standard rectangle channel shape, the one commonly used for channelizer prototype filters, do not result in a good linear approximation when different gains are applied to adjacent channels. Accordingly, a triangle channel shape is used as a preferred prototype filter.

It is well known that a multipath channel causes inter-symbol interference (ISI) to the received signal. In receivers operating on quadrature amplitude modulated (QAM) signals, the most widely used technique for mitigating the undesired channel effects is to use a finite impulse response (FIR) equalizer following the matched filter. The FIR equalizer can be designed subject to different criteria, among which, the zero forcing and minimum mean squared error (MMSE) are the most commonly used design criteria. The final goal is to have the overall cascade response of the shaping filter, channel, matched filter and the equalizer form a Nyquist channel.

Denoting the transmitted signal to be s(n), the received signal r(n) can be written as:

$$r(n) = s(n) * c(n) + w(n) \quad (7)$$

where, c(n) is the tapped delay line channel coefficients and w(n) is the additive white noise. In the time domain, the channel c(n) introduces multiple delayed, gain and phase modified versions of the transmitted signal which causes the ISI. When viewed in the frequency domain, the channel c(n) modifies the gain and phase of the transmitted signal's spectrum. This fact suggests that the equalization can be done in either time or frequency domain. Because of the implementation simplicity, the time domain linear equalizer, i.e., FIR filter, method is frequently used in many applications. Herein, a different approach is followed and an efficient frequency domain equalizer structure based on polyphase perfect reconstruction channelizer is described.

As described above, a channelizer disassembles the input spectrum while simultaneously shifting its fragments to baseband. The dimensionality of such an engine is designed according to the input signal. Also, workload issues help in the proper selection of the number of paths. Once the signal fragments are at baseband and their sample rate has been properly decreased (it is now commensurate to the new reduced bandwidth) one can equalize them via multiplier arrays. The equalization process is performed in the channelizer domain by applying appropriate complex scalars to the output ports of the analysis channelizer. The rotators adjust the gain and phase of each channelizer data path, undoing the amplitude and delay distortion caused by non-ideal wireless transmission. The multipliers are selected according to prior knowledge of the wireless transmission media. In an advantageous architecture, a matched filter is also formed by a second multiplier array having multipliers corresponding to the matched filter spectral response. In an embodiment, at the output of the synthesis channelizer, additional post processing may be applied to the filtered signal which might include arbitrarily interpolation to obtain two samples per symbol.

By including the intermediate processing section, the PR channelizer output y(n) can be expressed as:

$$y(n) = \Sigma_{l=1}^{M-1} C_l H_{MF}(l) h_{NYQ}(n) e^{j\omega_l n} * r(n) \quad (8)$$

where $$C_l = \Sigma_{l=0}^{M-1} c(n) e^{-j\omega_l n} \quad (9)$$

is the M point DFT of discrete channel taps; and $$H_{MF}(l) = \Sigma_{l=0}^{M-1} h_{MF}(n) e^{-j\omega_l n} \quad (10)$$

is the M point DFT of the receiver's matched filter impulse response $h_{MF}$. The output signal y(n) is now the equalized and matched filtered output signal.

To further demonstrate this channelizer (time) domain filtering operation, set $C_l = 0$, $l = 0 \ldots M-1$ and only examine the matched filter response. Although, any Nyquist channel $h_{NYQ}$(n) provides a perfect reconstruction in terms of analysis and synthesis channelization process, the performance of the frequency domain filtering may vary greatly. This difference is due to the fact of using Nyquist pulse-based piecewise linear spectrum approximation.

Figure 8:
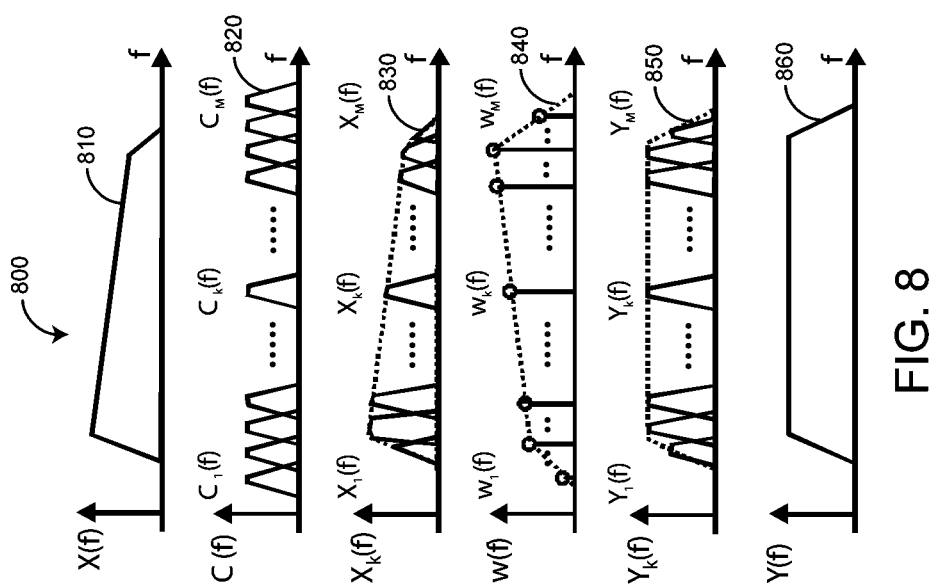
FIG. 8 are detailed frequency domain graphs illustrating the effects of channelizer (time) domain equalization.

FIG. 8 further illustrates equalization 800 in the channelizer domain. X(f) 810 is a stylized spectral representation of a received signal that has been distorted by the channel between the transmitter and the receiver through which the received signal has traversed. In this example the distortion is seen as a frequency dependent gain which had tilted the received spectrum. C(f) 820 is the equivalent spectral response of each filter formed by the perfect reconstruction analysis channelizer filter bank. $X_k(f)$ 830 are the segments of the input spectrum captured by the separate filters of the analysis synthesizer filter bank.

Also shown in FIG. 8, W(f) 840 are the scalar gains applied to the time series formed by the multiple channels of the input analysis channelizer filter bank. These complex scalar gains are determined by a channel probe or by an adaptive equalizer algorithm. $Y_k(f)$ 850 are the spectra of the separate channels after gain and phase corrected by the channelizer equalizer weights. Finally, Y(f) 860 is the broadband spectrum formed by the output synthesis channelizer that merged the multiple partitioned and scaled channel signal components. The reconstruction error between assembled signal formed by weighted and summed piecewise segmented spectral regions and the signal formed by a standard convolution process can be made arbitrarily by proper choice of the number of filter segments in the analysis and synthesis channelizers and by proper choice of spectral shapes of the prototype filters embedded in the analysis and synthesis channelizers.

Figure 9:
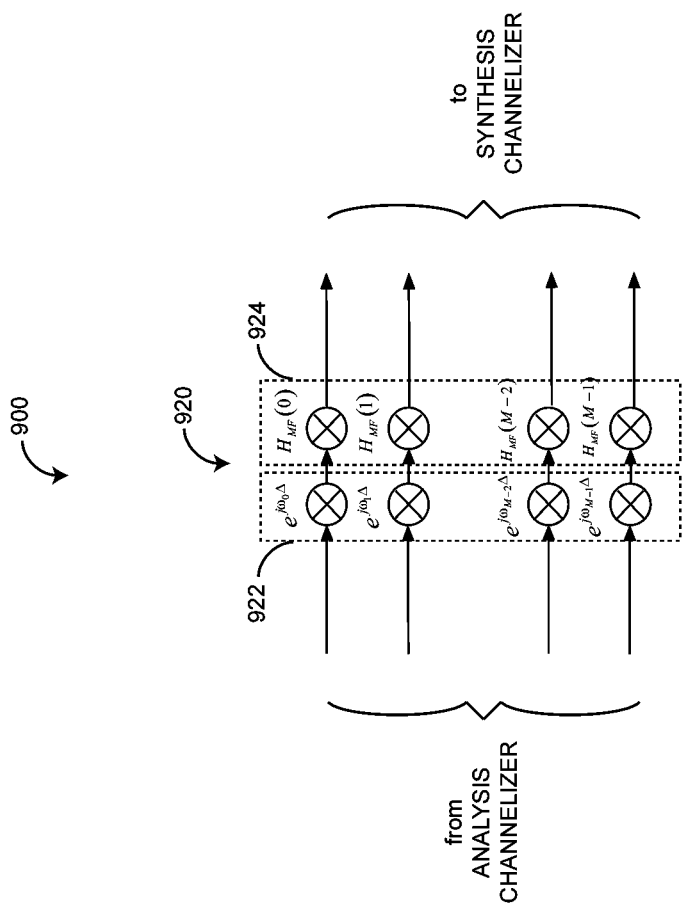
FIG. 9 is a general block diagram of timing recovery processing in the channelizer domain.

FIG. 9 generally illustrates timing recovery processing in the channelizer domain. The continuous time expression for a single carrier received signal is $$r_c(t) = \Sigma_k a_k p(t - kT_s) + w_c(t) \quad (9)$$

where $a_k$ are the equally likely information symbols drawn from an M-ary constellation with average symbol energy E, p(t) is the unity energy shaping pulse that spans 2L symbols, $w_c(t)$ is the additive white Gaussian noise with zero mean and power spectrum density $N_0$ and τ is the relative time delay between the transmitter and the receiver.

In a standard receiver, a matched filter with impulse response $h_{MF}(t) = p(-t)$ is the optimum detector whose output is sampled at the end of each symbol interval. The optimal sampling instant is the one which maximizes the signal-to-noise ratio (SNR) and it corresponds to the maximum opening position of the eye diagram. The time synchronization in such a receiver is achieved by tuning the receiver sampling phases under the guidance of a timing error estimation mechanism. The goal of the synchronizer is to sample the output of the matched filter at the optimum instant for the $k^{th}$ symbol which is $kT_s + \tau$. The synchronizer achieves this goal by controlling a sample-and-hold circuit located at the output of the analog matched filter.

Unlike the analog receiver which is able to tune the sampling instants, a modern digital receiver digitizes the received analog waveform prior to the matched filtering operation. For computational efficiency, the digital receiver's sampling period is often set to be 2 samples per symbol, i.e., $T = \frac{1}{2}T_s$, where T is the sampling period and $T_s$ is the symbol duration.

The log-likelihood function for an unknown timing offset τ is $$\Lambda(\tau) = \Sigma_k \ln\left[\left(\cosh\left(\frac{2E}{N_o} y(kT_s + \tau)\right)\right)\right] \quad (10)$$

where $$y(kT_s + \tau) = \frac{1}{\sqrt{E}} \int_{(k-L)T_s}^{(k+L)T_s} r_c(t) h_{MF}(kT_s + \tau - t) dt \quad (11)$$

is the normalized matched filter output for the $k^{th}$ symbol. The estimated timing phase $\hat{\tau}$ which maximizes the likelihood function is obtained by setting its first derivative to zero as shown in Eq. (12).

$$\Sigma_k \tanh\left(\frac{2E}{N_o}y(kT_s+\tau)\right)\frac{d}{d\tau}y(kT_s+\tau)=0 \quad (12)$$

Equation (12) suggests an effective timing error detector. The average of the products between the output of the matched filter, $y(t)=h_{MF}(t)*r_c(t)$, and its derivative forms the timing error signal which is the middle term in (12). The error signal then drives an arbitrary interpolator to resample the matched filter output. Those considerations are the starting points for designing a timing recovery loop.

Timing Recovery Model

A polyphase perfect reconstruction channelizer is a cascade of an analysis and a synthesis filter bank whose block diagrams are shown in FIG. 2, above. The analysis channelizer decomposes the input signal spectrum into equally spaced, equal bandwidth sub-channels while performing $$\frac{M}{2}:1$$

down-sampling of the input time series. The synthesis channelizer reassembles the M sub-channels while performing $$1:\frac{M}{2}$$

up-sampling. The composition of those two engines finds its most efficient application in multiple bandwidth signal scenarios in which the individual bands composing the input spectrum are all simultaneously down converted and reassembled in base-band by the synthesis block.

The perfect reconstruction property is achieved when the composite response of the analysis and synthesis prototype low-pass filter forms a Nyquist pulse. An architecture for timing recovery is based on the analysis-synthesis PR channelizer whose theoretical model is described above. The architecture is composed of three sections including an analysis filter bank, channelizer domain signal processing and a synthesis filter bank. The analysis and synthesis blocks belong to a PR channelizer to which the intermediate processing section has been added for the purpose of timing recovery and matched filtering.

As indicated in FIG. 3, let $h(n)$ be the analysis channelizer prototype low-pass filter of length $N_1$; and $g(n)$ be the synthesizer channelizer prototype low-pass filter of length $N_2$ where $N_1$ and $N_2$ are usually designed to be odd numbers. Then, the analysis filter $h_l(n)$ for the $l^{th}$ path is written as $h_l(n)=h(n)e^{j\omega_l n}$, where $$\omega_l = \frac{2\pi}{M}l$$

for $l=0, 1, \ldots M-1$. Similarly, the $l^{th}$ path synthesis filter is written as $g_l(n)=g(n)e^{j\omega_l n}$. The signal at the output of the $l^{th}$ analysis filter, denoted as $r_l(n)$, can be written as:

$$r_l(n)=\Sigma_{m=0}^{N_1-1}h_l(m)r(n-m) \quad (13)$$

Signal $r_l(n)$ is then $$\frac{M}{2}:1$$

down-sampled and translated to the baseband. Let $\hat{r}_l(n)$ be the $l^{th}$ down sampled base-band signal which is written as:

$$\hat{r}_l(n) = r_l\left(\frac{M}{2}n\right)e^{-j\omega_l\frac{M}{2}n} = r_l\left(\frac{M}{2}n\right)e^{-j\pi ln} = \begin{cases} r_l\left(\frac{M}{2}n\right), l \text{ is even} \\ r_l\left(\frac{M}{2}n\right)\cos(n\pi), l \text{ is odd} \end{cases} \quad (14)$$

From Eq. (14), after the $$\frac{M}{2}:1$$

down sampling, all the even indexed channels alias to the baseband and all the odd indexed channels alias to the half sample rate. Note that, the odd indexed channels can be translated to the base-band trivially by multiplying with cos($n\pi$) after the down sampling process.

Ignoring for now the intermediate processing steps, $\hat{r}_l(n)$ is $$1:\frac{M}{2}$$

zero packed and then fed into the $l^{th}$ path synthesis filter. The $$1:\frac{M}{2}$$

zero packing creates $$\frac{M}{2}$$

spectrum copies and the synthesis filter $g_l(n)$ selects the copy centered on $\omega_l$ while rejecting other copies. The $$\frac{M}{2}$$

sampling rate reduction allows the intermediate signal processing blocks to operate at reduced sample rate which makes the structure computationally efficient. By following the same reasoning, the overall PR channelizer output (analysis-synthesis chain) signal $y(n)$ can be expressed as:

$$y(n)=\Sigma_{l=1}^{M-1}r(n)*h_l(n)*g_l(n)=$$

$$=\Sigma_{l=1}^{M-1}\{[\Sigma_{m=0}^{N_1-1}h(m)e^{j\omega_l m}g(n-m)e^{j\omega_l(n-m)}]*r(n)\}$$

$$=\Sigma_{l=1}^{M-1}[(h(n)*g(n))e^{j\omega_l n}]*r(n)$$

$$=\Sigma_{l=1}^{M-1}h_{NYQ}(n)e^{j\omega_l n}*r(n) \quad (15)$$

where $k_{NYQ}(n)=h(n)*g(n)$, is the Nyquist pulse. Equation (15) explicitly shows that the PR channelizer implements a bank of M equally spaced Nyquist filters each centered on $\omega_l$. The frequency response of the adjacent Nyquist filters overlap at −6 dB (in power) and exhibit the even symmetry property with respect to the crossover point. Thus, the perfect reconstruction property is shown in Eq. (16).

$$\sum_{l=1}^{M-1} h_{NYQ}(n)e^{j\omega_l n} * r(n) = \sum_{l=1}^{M-1} Z_{\omega_l}(n) = r(n)\delta\left(n - \frac{N_1 + N_2}{2}\right) \quad (16)$$

Although an equality sign is used in Eq. (16), in practice the PR property is impaired by the filters' in-band ripple. From Eq. (16), $Z_{\omega_l}(n)$ is the shaped discrete Fourier transform (DFT) evaluated on frequency $\omega_l$ at time instant n. And the shaping pulse is $h_{NYQ}(n)$, which also governs the PR property.

The intermediate processing section in FIG. 9 is composed of two vectors of multipliers: the timing recovery vector and the frequency domain matched filtering vector. Because the channelizer offers free access to samples of the frequency domain, the matched filter can be embedded inside the channelization process. The frequency domain matched filter coefficients are obtained via M point DFT as shown in Eq. (17)

$$H_{MF}(l) = \sum_{n=-\frac{N_s}{2}}^{\frac{N_s}{2}-1} h_{MF}(n)e^{j\frac{2\pi}{M}ln}, \; l = 0, 1, \ldots M-1 \quad (17)$$

where $h_{MF}(n)$ is the impulse response of the discrete matched filter with length $N_3<M$. The matched filter output y(n) is then expressed as:

$$y(n)=\Sigma_{l=1}^{M-1}H_{MF}(l)Z_{\omega_l}(n) \quad (18)$$

The timing recovery vector is defined to be a set of complex rotators of length M, where the $l^{th}$ element is $e^{j\omega_l\Delta}$, l=0, 1, ... M−1. Appending this rotator array into Eq. (10), and denoting the channelizer output as $y^\Delta(n)$, we obtain $$y^\Delta(n)=\Sigma_{l=1}^{M-1}e^{j\omega_l\Delta}H_{MF}(l)Z_{\omega_l}(n)$$

$$\Sigma\Sigma_{l=1}^{M-1}H_{MF}(l)[h_{NYQ}(n)g^{j\omega_l(m+\Delta)}*r(n)]$$

$$=\Sigma_{l=1}^{M-1}H_{MF}(l)\Sigma_{p=0}^{N_1+N_2-1}h_{NYQ}(p)e^{j\omega_l(p+\Delta)}r(n-p)$$

$$=\Sigma_{l=1}^{M-1}H_{MF}(l)\Sigma_{p=0}^{N_1+N_2-1}h^{-\Delta}_{NYQ}(p)e^{j\omega_l p}r^\Delta(n-p)$$

$$=y(n+\Delta) \quad (19)$$

where $h^{-\Delta}_{NYQ}(n)=h_{NYQ}(n-\Delta)$ and $r^\Delta(n)=r(n+\Delta)$ are the digital signals sampled on $\Delta$ retarded and advanced clock. It should be noted that $h^{-\Delta}_{NYQ}(n)$ and $r^\Delta(n)$ are the intermediate artifacts generated during the derivation, thus do not need to be computed. From Eq. (19), by applying the timing vector, there is the capability to time advance or retard the sampling clock by $\Delta$ seconds, and $\Delta$ can be assigned any real number. Comparing with time domain interpolation based methods, where $\Delta$ is drawn from a finite set of discrete elements spanning the symbol interval $[0,T_s]$, there is the capability to arbitrarily tune the time phase of the received and matched filtered signal.

Figure 10:
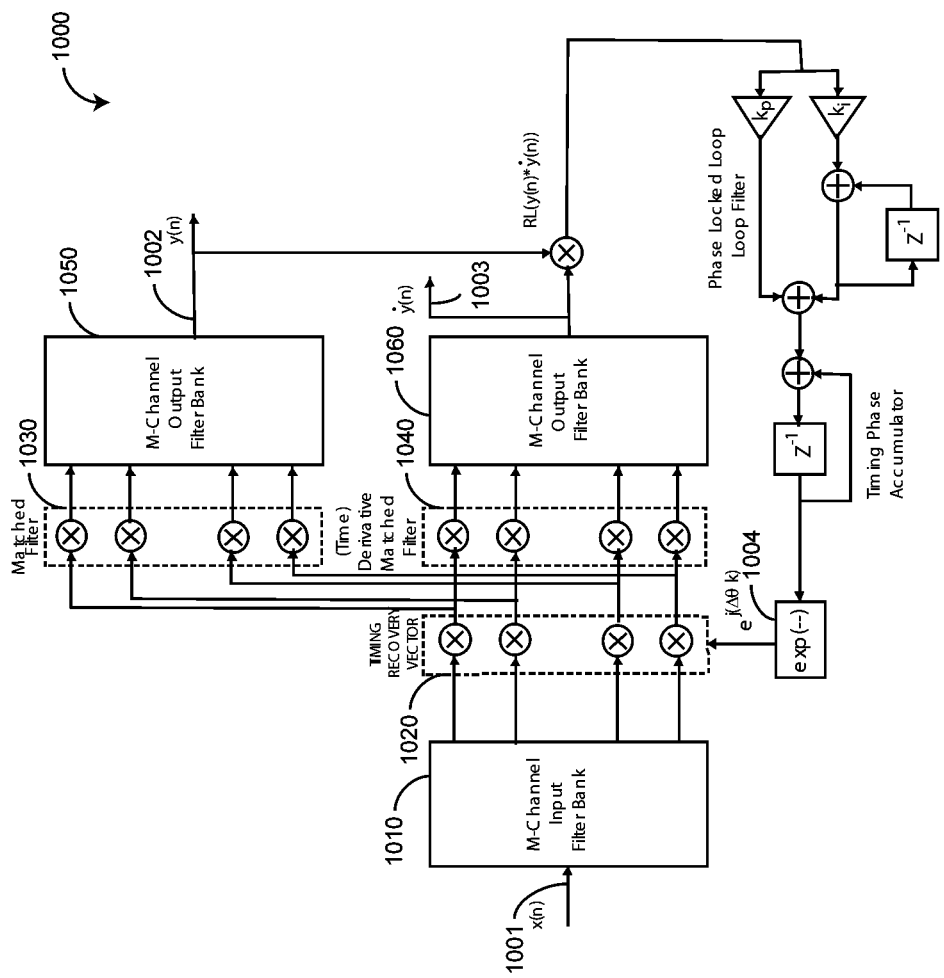
FIG. 10 is a detailed block diagram of a timing recovery phase-locked loop (PLL)

FIG. 10 illustrates a timing recovery phase-locked loop (PLL) and in particular the use of channelizer domain synchronization in advantageously performing a digital receiver timing recovery function. In this operation, the sample locations of the output data stream y(n) are aligned with the time locations of the underlying modulation envelope. This alignment shifts the output sample locations to the time location at which the receiver eye-diagram has the maximum eye-opening of the modulation envelope. This location assures that the output samples of the matched filter exhibit maximize signal to noise ratio.

The time shift required to perform the time alignment is traditionally performed by an arbitrary time domain interpolating filter. Such a filter exhibits unity magnitude gain over the signal bandwidth and a phase shift that varies linearly with frequency. As shown in FIG. 10, the frequency dependent phase shift is accomplished by applying phase shifts directly to the time series output from each channelized filter. The phase shift proportional to the channelized filter's k-th center frequency is indicated by the phase term $\exp(j\,\Delta\theta\,k)$ at the output of the $\exp(--)$ phase rotator block.

The determination of the phase shift per channel filter required to accomplish this alignment is performed by the phase locked loop which, operating as a feedback controller, varies the phase shift profile $\Delta\theta$ k in the direction to force the product $y(n)*\dot{y}(n)$ to zero. The $y(n)*\dot{y}(n)$ in turn is formed from the outputs of the two equivalent filters, the digital receiver matched filter and the digital receiver time derivative matched filter formed here as the outputs of the M-Channel output filter banks. Other filter options that support the support the timing recovery, timing alignment process, such as band-edge filters can be implemented by the same channelizer domain filtering process.

There is a major implementation benefit to forming the two filter outputs in the channelizer domain as weighted terms applied to the intermediate time series at the output of the M-channel Input filter bank. The benefit can easily be seen if we consider the bandwidth of the signal processed by the receiver to be say, 1200 MHz with a sample rate of 2400 MHz. The direct filtering of the data samples at the 2400 MHz sample rate would be extremely difficult since the clock rate of the arithmetic resources, multipliers, adders, and memory transfers, is likely to be lower than the input sample rate. In the channelizer domain, the input time series is partition to a set of M, with M=120 as an example, narrow band time series, with reduced sample rate of 20 MHz per channel time series. The application of the channel gain terms at 20 MHz per channel series can be performed with multiple low sample rate processing resources as a trivial operation. The channelizer domain filtering process is seen to be an essential enabling technology for the implementation of very wide bandwidth receiver systems.

Figure 11:
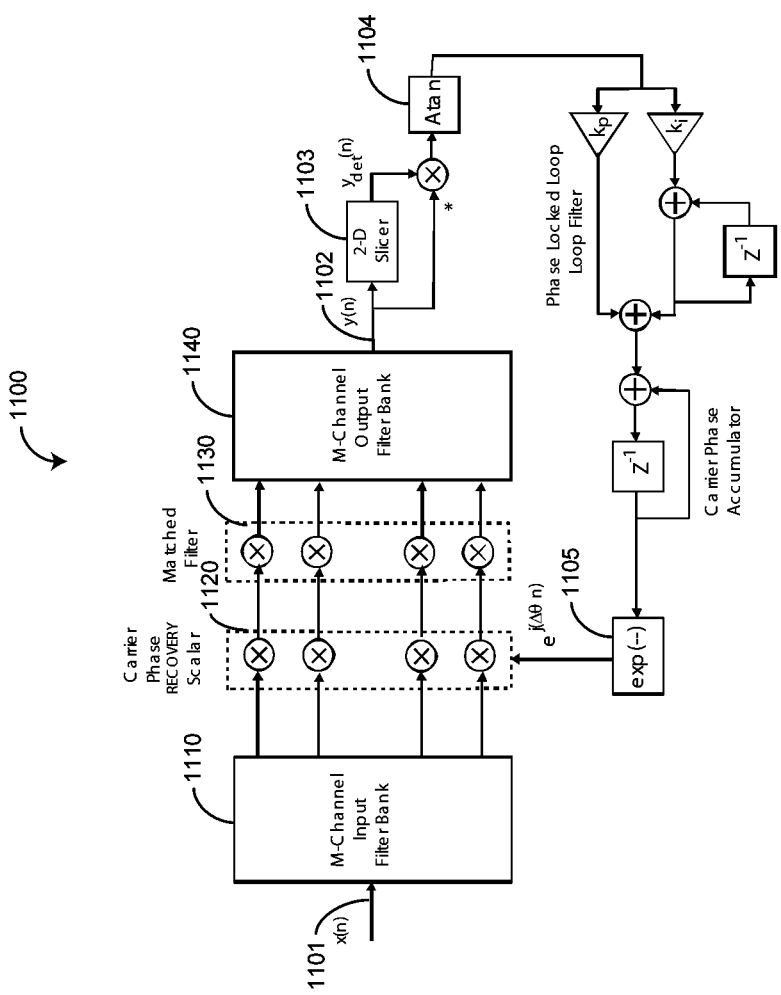
FIG. 11 is a detailed block diagram of a carrier recovery PLL.

FIG. 11 illustrates a carrier recovery PLL to advantageously perform digital receiver carrier frequency and carrier phase recovery in the channelizer domain. In this operation, carrier frequency alignment is performed by de-spinning samples of the complex output from the matched filter. The de-spinning is performed by multiplying the spinning samples with a counter spinning complex sinusoid output from a direct digital synthesizer (DDS). The small frequency offset is the residual frequency error remaining after the received signal's initial heterodyne to baseband. The, now de-spun, time samples are then phase aligned with the nominal constellation points of the underlying modulation envelope. This time domain phase alignment is traditionally accomplished by adding the desired correction to the phase of the DDS that performs the residual heterodyne of the complex input time series.

The heterodyne required performing the phase de-spinning and phase alignment is traditionally applied in the time domain at the input to the matched filters. As noted in the discussion of the timing recovery process, the sample rate of the input signal may be too high to apply the corrective de-spin operation. The de-spinning operation and the phase alignment of the digital receiver input signal can be applied by multiple low data rate de-spinners applied to the low data rate time series formed by the M-channel input filter bank.

As shown in FIG. 11, the counter rotating de-spinning complex sinusoids are applied to the time series outputs from each channelized filter. The time domain de-spinner is indicated by the phase term $\exp(j \Delta\theta\, n)$ at the output of the $\exp(--)$ phase rotator block. Note that this is a rotating time series or spinning phasor applied to the output of each channelizer filter to effect small shifts of the signal's spectrum for the carrier recovery process as opposed to a constant frequency dependent non-spinning phase term $\exp(j \Delta\theta\, k)$ applied to effect small time shifts for the timing recovery process.

The determination of the common frequency and phase correction applied to channel filter required to accomplish this frequency and phase alignment is performed by the phase locked loop which, operating as a feedback controller, varies the phase shift profile $\Delta\theta\, n$ in the direction to force the product $y(n)^* y_{det}(n)$ to zero. The $y(n)^* y_{det}(n)$ in turn is formed from the conjugate product of the input and output of the outputs of the 2-D slicer located at the output of the matched filter. Other filter options that support the support the carrier recovery frequency alignment process, such as band-edge filters can be implemented by the same channelizer domain filtering process.

Figure 12:
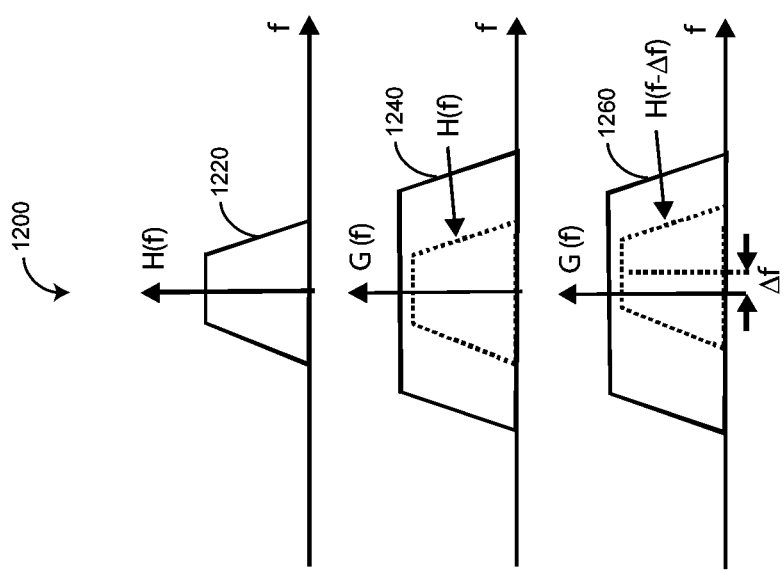
FIG. 12 are frequency domain graphs illustrating input and output filter aspects of carrier recovery using channelizer (time) domain processing.

FIG. 12 illustrates input and output filter aspects of a carrier recovery PLL. In particular, H(f) and G(f) show bandwidths of the input filter bank and output filter bank, respectively. The output filter bank advantageously has a wider bandwidth to permit the time-series formed by the input filter bank to be heterodyned by the frequency offset $\Delta f$ between the input and output filter banks.

A synchronization recovery system has been disclosed in detail in connection with various embodiments. These embodiments are disclosed by way of examples only and are not to limit the scope of the claims that follow. One of ordinary skill in art will appreciate many variations and modifications.

What is claimed is:

1. A synchronization recovery system comprising:
    a digitized signal input derived from an analog front-end of a digital receiver and having a relatively wide bandwidth;
    an analysis channelizer that decomposes the digitized signal input into a plurality of time domain analysis channels each having a relatively narrow bandwidth;
    a synthesis channelizer that recomposes the analysis channels so as to generate a digitized output signal;
    a first multiplier array disposed between the analysis channelizer and the synthesis channelizer so as to define a timing recovery vector; and
    a second multiplier array disposed between the analysis channelizer and the synthesis channelizer so as to define a matched filtering vector,
    wherein the timing recovery vector comprises a set of complex rotators that define a phase shift for retarding and advancing a timing clock.

2. The synchronization recovery system according to claim 1 further comprising a PLL responsive to the synthesis channelizer digitized output signal so as to modify the timing recovery vector.

3. The synchronization recovery system according to claim 2 wherein the timing recovery vector applies the phase shift to the time domain analysis channels.

\* \* \* \* \*